United States Patent
Turner et al.

(10) Patent No.: US 9,563,101 B2
(45) Date of Patent: Feb. 7, 2017

(54) COMMON-PATH NONCOLLINEAR OPTICAL PARAMETRIC AMPLIFIER

(71) Applicant: New York University, New York, NY (US)

(72) Inventors: Daniel B. Turner, New York, NY (US); Alexander T. Martin, New York, NY (US); Laurie A. Bizimana, New York, NY (US)

(73) Assignee: New York University, New York, NY (US)

(*) Notice: Subject to any disclaimer, the term of this patent is extended or adjusted under 35 U.S.C. 154(b) by 0 days.

(21) Appl. No.: 14/812,781

(22) Filed: Jul. 29, 2015

(65) Prior Publication Data

US 2016/0033850 A1   Feb. 4, 2016

Related U.S. Application Data

(60) Provisional application No. 62/032,281, filed on Aug. 1, 2014.

(51) Int. Cl.
*G02F 1/39* (2006.01)
*H01S 3/00* (2006.01)
*H01S 3/10* (2006.01)

(52) U.S. Cl.
CPC ......... *G02F 1/397* (2013.01); *G02F 2001/392* (2013.01); *H01S 3/0071* (2013.01); *H01S 3/0092* (2013.01); *H01S 3/10023* (2013.01)

(58) Field of Classification Search
CPC  G02F 2001/392; H01S 3/0071; H01S 3/0092; H01S 3/10023
See application file for complete search history.

(56) References Cited

U.S. PATENT DOCUMENTS

| | | | | |
|---|---|---|---|---|
| 7,106,498 B2* | 9/2006 | Pan | ........................... | G02F 1/39 359/326 |
| 2005/0271094 A1* | 12/2005 | Miller | ....................... | G02F 1/39 372/25 |
| 2006/0044642 A1* | 3/2006 | Pan | ........................... | G02F 1/39 359/330 |
| 2009/0161092 A1* | 6/2009 | Zanni | ....................... | G01J 3/433 356/51 |
| 2011/0013265 A1* | 1/2011 | Nishimura | ................ | G02F 1/39 359/328 |
| 2011/0141467 A1* | 6/2011 | Brixner | ................... | G01J 3/433 356/323 |

* cited by examiner

*Primary Examiner* — Eric Bolda
(74) *Attorney, Agent, or Firm* — Foley & Lardner LLP

(57) ABSTRACT

Systems and methods for providing a noncollinear optical parametric amplifier (NOPA). Two approaches for classes of NOPA are described: phase-mask NOPA and Wollaston NOPA.

16 Claims, 8 Drawing Sheets

COMMON-PATH NONCOLLINEAR OPTICAL PARAMETRIC AMPLIFIER

CROSS-REFERENCE TO RELATED APPLICATIONS

This application claims the benefit of U.S. Provisional Application No. 62/032,281 filed on Aug. 1, 2014, which is hereby incorporated by reference in its entirety.

BACKGROUND OF THE INVENTION

Noncollinear optical parametric amplifiers (NOPAs) generating sub-20 femtosecond pulses in visible were demonstrated in the late 1990s. Despite significant improvements in spectral bandwidth and stability, the NOPA can be a tedious optical tool because of its strict alignment requirements and its sensitivity to perturbations. The geometry of a traditional NOPA is similar to a Michelson interferometer, in which the beams travel separate paths before recombining. Researchers have shown that a common-path geometry— wherein the two beams never encounter individual reflective optics—can significantly reduce fluctuations in a variety of optical devices; for example, a common-path interferometer, which is largely immune to vibrational perturbations, has been employed to obtain high accuracy phase measurements with a liquid crystal spatial light modulator.

Additionally, researchers have made simple modifications to optical microscopes based on common-path interferometric stabilization, resulting in enhanced optical resolution in aperture limited systems. In nonlinear optics, a common-path approach significantly increases second-harmonic generation signals, and most two-dimensional electronic spectrometers rely on the passive stabilization provided by a common-path geometry. While a NOPA is distinct from an interferometer because a NOPA utilizes a pump that is polarized perpendicular to the seed, the phases of the pump, signal, and idler are important, and the stringent spatial overlap requirements makes the comparison between the devices both natural and productive. The NOPA remains an imposing optical tool because of its strict alignment requirements and its sensitivity to environmental perturbations such as air currents and mechanical vibrations. Prior NOPA designs are based on an adjustable pathlength Michelson interferometer (M-NOPA).

The foregoing summary is illustrative only and is not intended to be in any way limiting. In addition to the illustrative aspects, embodiments, and features described above, further aspects, embodiments, and features will become apparent by reference to the following drawings and the detailed description.

SUMMARY OF THE INVENTION

One embodiment relates to an optical parametric amplifier. The amplifier comprises a light source and a phase-stable optical splitter configured to receive light from the light source. First beam optics are in optical communication with the phase-stable optical splitter. Second beam optics are in optical communication with the phase-stable optical splitter. Common path reflective elements are positioned relative to the first beam optics and the second beam optics for receiving and redirecting light from the first beam optics and the second beam optics.

Another embodiment relates to a method of optical parametric amplification comprising: splitting a beam of light into a first beam and a second beam, each of the first beam and second beam being phase-stable and parallel; optically processing the first beam with a set of first beam optics; optically processing a second beam with a set of second beam optics; and reflecting the first beam and the second beam with common path reflective elements such that the first beam and second beam are non-parallel and cross at an optical element.

One embodiment relates to a phase-mask optical parametric amplifier. Another embodiment relates to a Wollaston prism optical parametric amplifier.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 1A shows an embodiment of a PM-NOPA using a phase mask to split the beam into parallel trajectories. FIG. 1B shows an embodiment of a 3W-NOPA using three Wollaston prisms with a mirror pair to ensure that no beam is individually reflected. FIG. 1C shows an embodiment of a 1W-NOPA using one Wollaston prism with a mirror pair to ensure that no beam is individually reflected. For FIG. 1B and FIG. 1C, increasing the angle between mirrors in the second pair yields a noncommon-path configuration.

FIG. 2A is a Spectra from three NOPAs under typical alignment conditions. FIG. 2B is the TG-FROG measures a pulse duration of 17 fs. FIG. 2C Far-field (2 m) beam profile of 1W-NOPA reveals a circular spatial profile and lack of spatial chirp.

DETAILED DESCRIPTION OF THE PREFERRED EMBODIMENTS

Figure 1A:
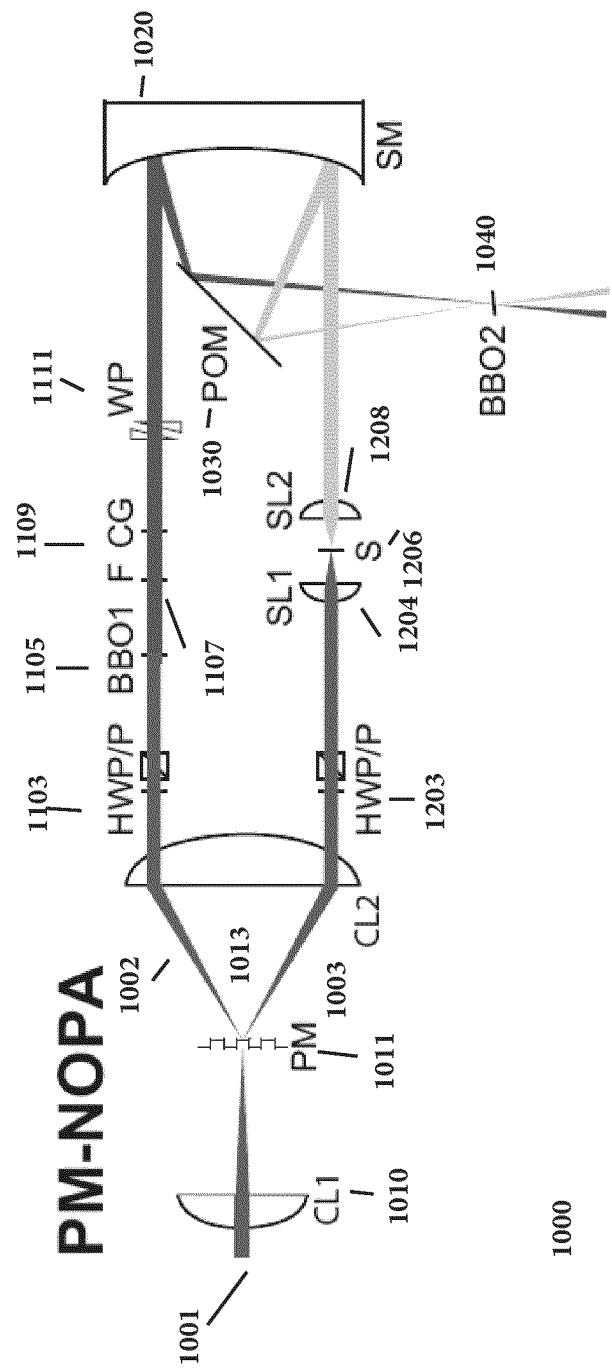
FIGS. 1A-1C show a schematic of three common-path NOPAs.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are systems and methods for providing a noncollinear optical parametric amplifier (NOPA). Two approaches for novel classes of NOPA are described herein: phase-mask NOPA and Wollaston NOPA, including an embodiment with a single Wollaston prisms (1W-NOPA) and an embodiment using three Wollaston prisms (3W-NOPA). The two NOPA designs are 'common path' because there are no reflective optics except those that are common to both white-light and pump beams. Both embodiments utilize a source light beam, such as a laser.

The first approach, referred to as phase-mask NOPA, described here involves a transmissive diffraction grating with a small groove density, an optic commonly known as a phase mask. Phase masks are used in a variety of linear and nonlinear optical setups, and have played a large role in the proliferation of 2D optical spectrometers. In the phase-mask based NOPA (PM-NOPA) 1000 described here, a cylindrical telescope with cylindrical lens (CL) 1010,1012 surrounds the phase mask (PM) 1011 to produce from the initial beam 1001 two parallel beams 1002, 1003 separated by a desired distance.

The first parallel beam 1002 then proceeds through a series of optics, in one embodiment: a half-wave plate and polarizer (HWP/P) 1103, a first beta Barium Borate crystal (BBO1) 1105, a blue-pass filter (F) 1107, a compensation glass (CG) 1109 and a wedge pair (WP) 1111. The first beam 1002 then engages a spherical mirror 1020 and a pick-off mirror 1040 to reposition the first beam 1002.

The second beam 1003 proceeds through a series of optics, including in one embodiment: a half-wave plate and polarizer (HWP/P) 1203, a first spherical lens 1204, a sapphire 1206, and a second spherical lens 1208. The second beam 1003 then engages the spherical mirror 1020 and the pick-off mirror 1030 to reposition the second beam 1002.

The first beam 1002 and second beam 1003 proceed non-parallel, crossing at a second BBO crystal 1040.

The PM-NOPA 1000, depicted in FIG. 1A, uses a phase mask 1011 (2-mm thick, unblazed, UV fused silica, d=10 μm, etch depth appropriate for 800 nm) placed in the focal plane for a cylindrical telescope (in one example, $f_1=f_2=150$ mm). From a single input beam, the three optics generate two parallel, collimated beams separated by about 21 mm after CL2, while staying just below the damage threshold of the phase mask. Half-wave plate and cube polarizer combinations in each arm provide fine adjustment of the pulse energy. In the white-light arm a spherical lens (f=50 mm) focuses the beam into a 2-mm thick sapphire plate, followed by a spherical lens (f=50 mm, $CaF_2$, 2.1-mm central thickness for collimation of the supercontinuum seed beam. The pump and seed are focused to the mixing BBO ($\theta=2.73°$, 1-mm thick) by the combination of a concave spherical mirror (50.8-mm diameter, f=200 mm) and a pick-off mirror.

The second approach is a NOPA based on Wollaston prisms (W-NOPA) 2000. The initial Wollaston prism 2012 produces from the initial beam 2001 two parallel beams 2002, 2003 separated by a desired distance. In one embodiment, the WP 2012 refracts the incoming beam into two orthogonally polarized beams at an angle of about 20°. An additional Wollaston prism 2101 and 2201 in each arm refracts the beams into parallel trajectories separated by a desired distance.

The first parallel beam 2002 then proceeds through a first Wollaston prism 2101 followed by a series of optics. In one embodiment the series of optics is the same as for PM-NOPA first beam 1002 following the cylindrical lens 1013: a half-wave plate and polarizer (HWP/P) 2103, a first beta Barium Borate crystal (BBO1) 2105, a blue-pass filter (F) 2107, a compensation glass (CG) 2109 and a wedge pair (WP) 2111. The first beam 2002 then engages a spherical mirror 2020 and a pick-off mirror 2030 to reposition the first beam 2002.

Figure 1B:
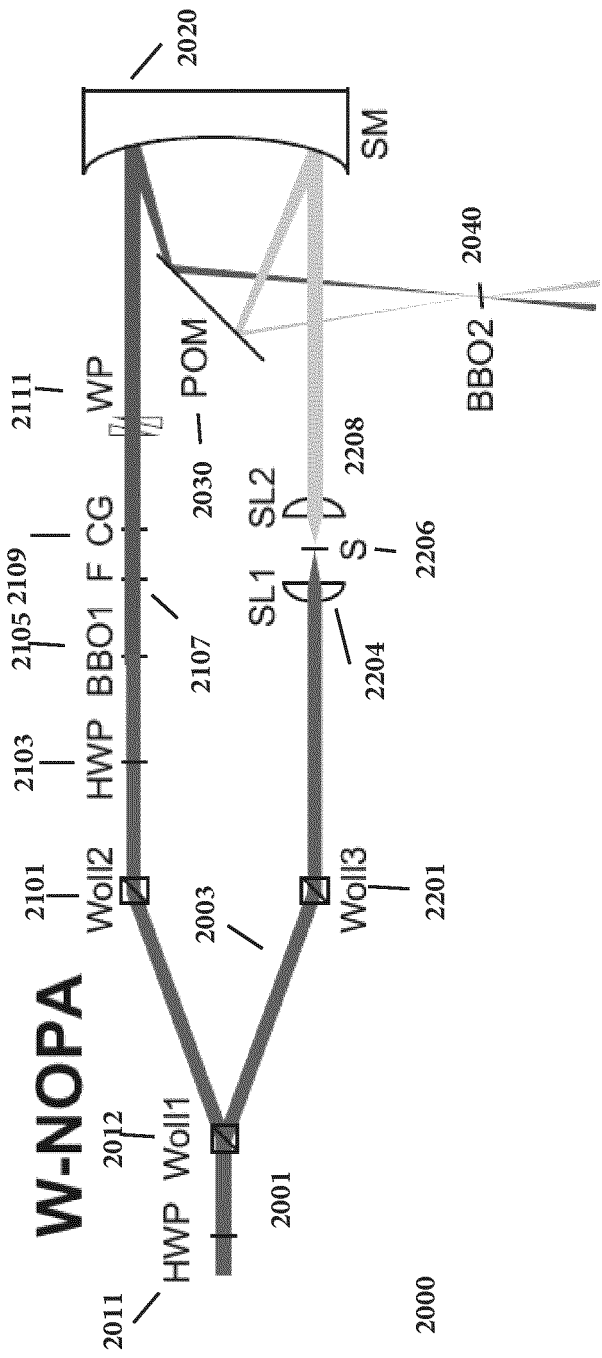

The second parallel beam 2003 then proceeds through a second Wollaston prism 2201 followed by a series of optics. The Wollaston prisms provide both for beam splitting and control over beam intensity. In one embodiment the series of optics is the same as for PM-NOPA second beam 1103 following the cylindrical lens 1013. In the embodiment of FIG. 1B: a first spherical lens 2204, a sapphire 2206, and a second spherical lens 1208. The second beam 2003 then engages the spherical mirror 2020 and the pick-off mirror 2030 to reposition the second beam 2002.

The first beam 2002 and second beam 2003 proceed non-parallel, crossing at a second BBO crystal 1040.

The W-NOPA 2000, depicted in FIG. 1B, uses a set of three Wollaston prisms 2012, 2101, 2201 (10-mm thick, calcite, 20° total angular deviation) to generate two parallel, collimated beams, separated by the requisite spacing for proper phase matching. Unlike polarized beam splitters, which yield one transmitted and one reflected beam, the polarization-dependent refraction of a Wollaston prism 2012 yields a pair of beams that transmits through the optic but at different angles. The pulse energy for the white light generation is controlled with a half-wave plate 2011 before the first Wollaston prism 2012 and the pump pulse energy is controlled by a second half-wave plate 2103 before the doubling BBO 2105. An advantage of the design is that the optics used to split the two beams also provide attenuation with negligible losses. In one embodiment, optics other than the Wollaston prism 2012, 2101, 2201 are identical to the PM-NOPA 1000. The pump and seed are recombined and focused to the mixing crystal buy a pickoff mirror and concave mirror (75-mm diameter, f=500 mm).

Figure 1C:
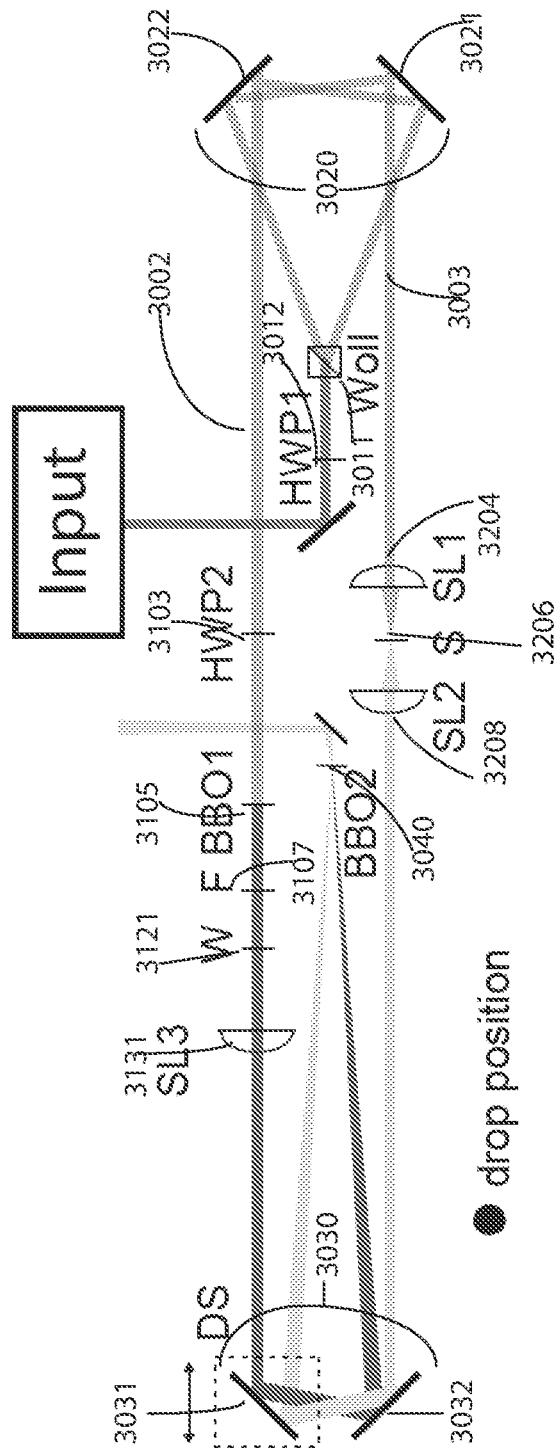

FIG. 1C illustrates an alternative NOPA design using a single Wollaston prism rather than three as in the embodiment of FIG. 1B. This embodiment uses one Wollaston prism 3012 and a first pair of dielectric mirrors 3020, preferably whose planes intersect at 85°. A first mirror 3021 of the first pair receives the first beam 3002 from the Wollaston prism and a second mirror 3022 of the first pair receives the second beam 3003 from the Wollaston prism. Each mirror of the first pair 3020 reflects both incoming beams onto parallel trajectories in a folded geometry. In one embodiment, a half-wave plate (HWP1) 3011 before the Wollaston prism (Woll) 3012 controls the relative energy in each beam. First beam optics and second beam optics are associated with the respective first and second beams and common path reflective elements are common to both beams. The first beam optics comprise, in one embodiment, a half-wave plate (HWP2) 3103 before the doubling crystal 3105 (BBO1, $\theta=29.2°$, 1-mm thick) yields fine control of pump energy. During alignment, HWP1 3011 is adjusted to optimize white-light generation first and adjust HWP2 3103 to optimize pump energy second. A lens (SL3, f=1 m, CaF2) 3131 focuses the pump. The first beam optics may further comprise one or more of a polarizer, a blue-pass filter 3121, a compensation glass and a wedge pair.

The second beam 1003 proceeds through the second beam optics, which include, in one embodiment: a half-wave plate and polarizer (HWP/P), a first spherical lens 3204, a sapphire 3206, and a second spherical lens 3208.

A second pair of mirrors 3030 (e.g., enhanced aluminum coating) whose planes intersect, preferably at 88°, steer the individually focused white-light and pump beams toward the mixing crystal (BBO2, θ=27.3°, 1-mm thick) 3040. A first mirror 3031 of the second pair receives the first beam 3002 from the first beam optics and a second mirror 3032 of the second pair 3030 receives the second beam from the second beam optics. The angle of the second pair 3030 controls the pump-tilt angle for phase-matching. One mirror, such as the first mirror 3031 of the second set 3030, placed on a manual delay stage (DS) for fine control of timing. By rotating the mirrors in the second pair 3030 such that their planes are nearly parallel, the preferred CP-NOPA can be reconfigured into a noncommon-path configuration.

In this way, the design guarantees that a vibration or fluctuation in one mirror will affect both beams equally. This same structure is then used at the other end of the setup, where a second pair of mirrors reflects both blue and white-light beams. Experimental results show that these changes increase the stability of the output laser beam.

One can adjust the phase-matching angle in the common-path NOPAs at multiple levels. Gross adjustment of the PM-NOPA 1000 involves proper selection of the focal lengths of the cylindrical lenses, the grating spacing of the phase mask, and the focal length of the spherical mirror. Gross adjustment of the WP-NOPA 2000 involves correct placement of the Wollaston prisms and proper selection of the spherical mirror. For both common-path NOPAs, fine adjustment involves appropriately spacing the glass wedges, and very fine adjustment involves a tiny lateral translation of SL2.

EXAMPLES

To benchmark the two new designs, a conventional Michelson-type NOPA (M-NOPA) as a benchmark for the new designs. A beamsplitter reflects 5% of the incoming beam. In the reflected beam, a half-wave plate and cube polarizer combination provide fine adjustment of the pulse energy, and an antireflection-coated lens (f=5 cm) focuses the beam into a 2-mm thick sapphire plate. A 90° off-axis parabolic mirror (f=5 cm) collimates the supercontinuum seed beam. A concave mirror (f=75 cm, used at 3° incidence) focuses the seed to the mixing BBO crystal (θ=27.3°, 1-mm thick). To generate the blue pump, the beam that transmits through the beamsplitter traverses a compensating glass plate, a half-wave plate (for polarization rotation), and a BBO crystal (θ=29.2°, 1-mm thick). A 400-nm bandpass filter (40-nm FWHM) removes the residual near-IR beam. A spherical lens (f=75 cm, CaF2) focuses the pump beam to the mixing BBO crystal.

Spectral Properties

Figure 2A:
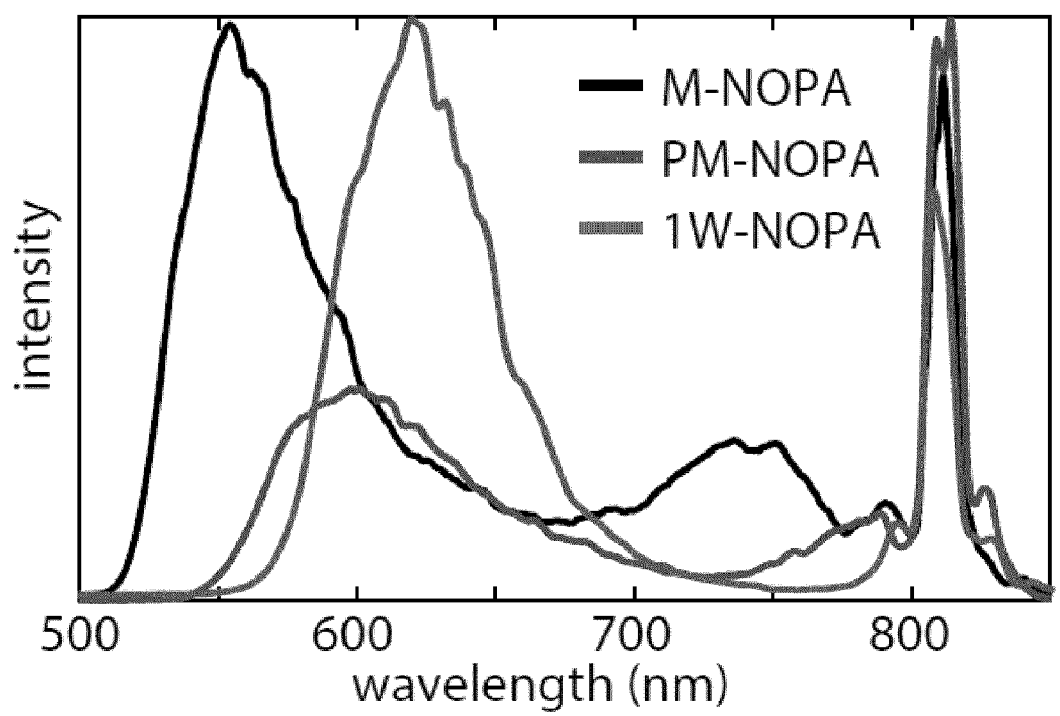
FIG. 2A-2C illustrate certain NOPA characteristics.
Figure 2B:
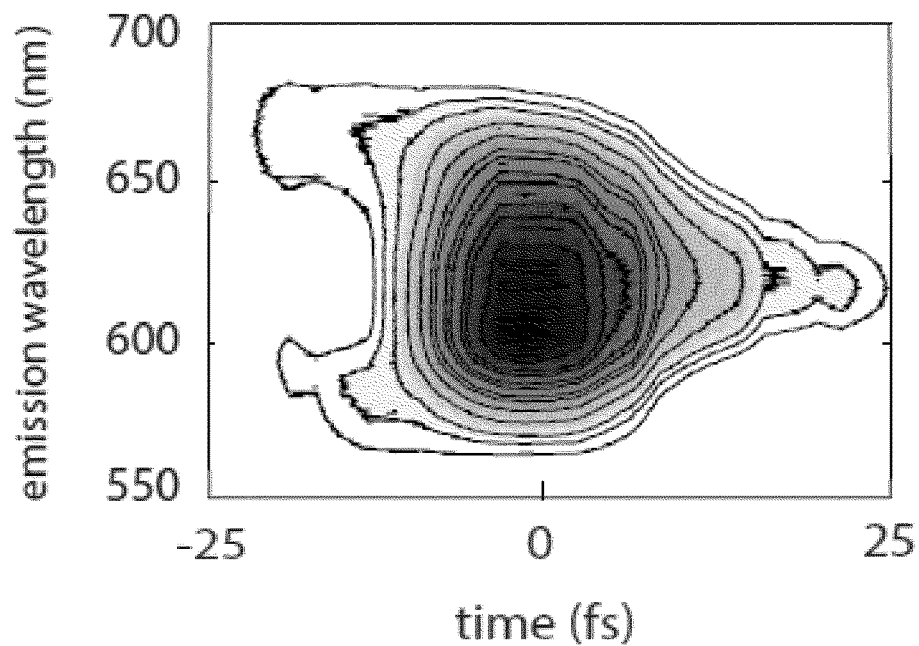
Figure 2C:
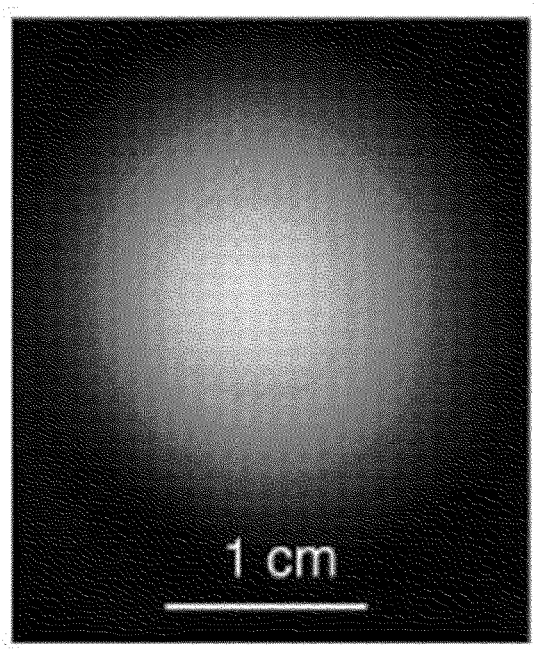

For all NOPAs the shot-to-shot stability of a typical (pristine) alignment is about 1% (0.3%) RSD and the amplification efficiencies are about 4% with 22 µJ pump energy and 10% with 30 µJ pump energy, using a 750-nm shortpass filter to remove residual 810-nm contributions. The CP-NOPAs can yield outputs with spectroscopically useable bandwidths up to 250 nm, see FIG. 2A. Some applications require narrower bandwidths. One way to limit the bandwidth is to use a thicker lens for white-light refocusing because it will induce temporal dispersion. After compressing the output of the 1W-NOPA with a grating compressor (333 lines/mm grating, 25-cm focal length cylindrical mirror) and pair of chirped mirrors, the pulse duration is 17 fs as shown by the TG-FROG in FIG. 2B. The spatial chirp at a distance of 2 meters is negligible, see FIG. 2C.

Perturbative Studies

Figure 3:
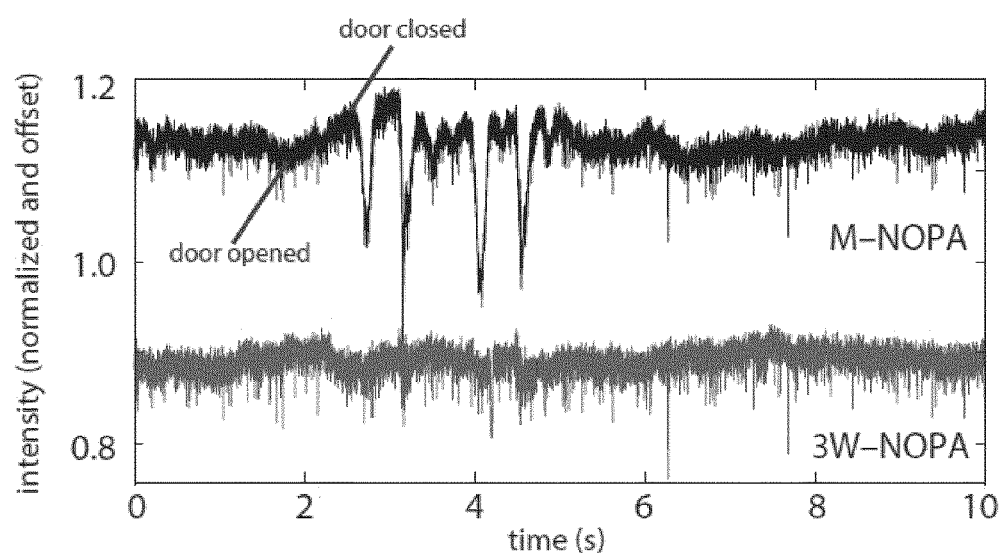
FIG. 3 illustrates shot-to-shot intensity measurements of two simultaneously operating NOPAs. The M-NOPA shows nearly 40% fluctuations, while the 3W-NOPA shows minimal change when a researcher opened the door and exited the laboratory. The traces are normalized and then vertically offset for clarity.

After verifying that the spectral bandwidth, power conversion efficiency, and temporal compressibility of the CP-NOPAs were equivalent to or competitive with the M-NOPA, we evaluated their relative robustness. Below is described head-to-head comparisons of the various NOPA geometries. In an initial experiment, 10-second traces of simultaneous shot-to-shot measurements of the M-NOPA and 3W-NOPA output intensities were acquired. The M-NOPA and 3W-NOPA were set to equivalent alignment conditions yielding 1% RSD, using a 750-nm shortpass filter in each beam after amplification to eliminate residual pump contributions. A researcher induced significant air-pressure fluctuations by opening and closing the door in the process of exiting the laboratory. The traces shown in FIG. 3 reveal that the variations in the M-NOPA output intensity due to perturbation are significantly higher than the 3W-NOPA, showing by example that the CP-NOPAs are more robust than the M-NOPA.

In another assessment, the 1W-NOPA is sequentially operated in common-path and noncommon-path configurations while inducing reproducible vibrational perturbations. The change from a common-path to a noncommon-path configuration is achieved through a minor modification of the instrument, by rotating each mirror in the second mirror pair so that each beam only reflects off one mirror before reaching the mixing crystal (BBO2). To evaluate the lower-frequency response, a standard lacrosse ball (64-mm diameter, 145 grams) was pushed laterally off a platform that was 0.24 meters above the laser table. To evaluate the higher-frequency response, a standard golf ball (43-mm diameter, 45 grams) was used. The landing area, marked in FIG. 1, is 13 cm from the second mirror pair. The method is an impulsive, perturbative vibrational test similar to the impact hammers used by optical table manufacturers to generate compliance curves.

Figure 4:
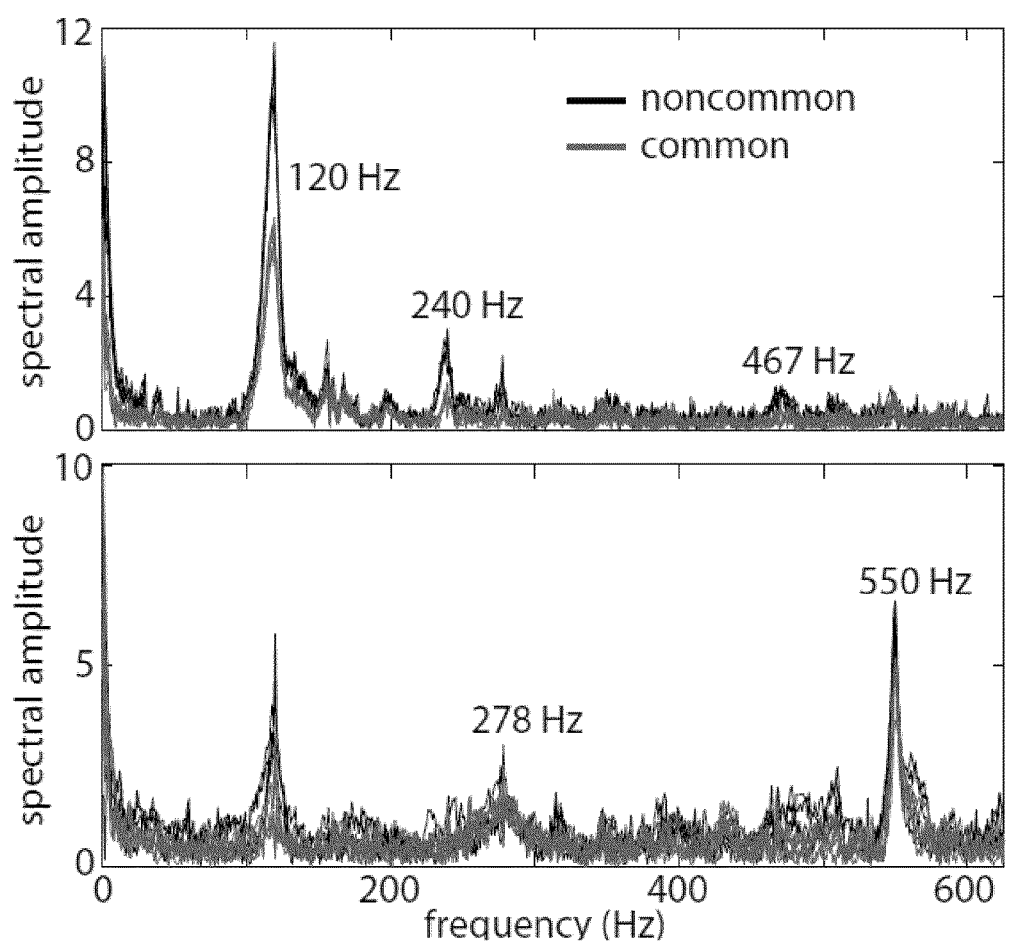
FIG. 4 illustrates one embodiment of a 1W-NOPA responses to low-frequency (top) and high-frequency (bottom) vibrational perturbations in common-path and non-common-path configurations. 16 trials were plotted, 4 for each perturbation type for each configuration. The common-path configuration is about half as sensitive as the noncommon-path configuration.

To analyze the mechanical vibrations induced by the balls, time-domain datasets were acquired, each consisting of 12,500 shots of the NOPA output, and then Fourier transformed each trace without zero padding. FIG. 4 depicts four independent trials for both high frequency (golf ball) and low frequency (lacrosse ball) perturbations for both common-path and noncommon-path configurations. Without perturbation, an equivalent analysis yields only one weak feature above the noise level. The feature is located at 120 Hz with amplitude about 1 and width of 1 Hz. The overlap of the traces in FIG. 4 indicates the reproducible nature of the assessment method and analysis. Based on reduction in amplitude of features at 120, 240, 467, and 550 Hz, the common-path configuration is about half as sensitive to vibrations across the detected frequency range. One mode induced by the golf ball—the peak centered at 278 Hz—is not damped. This feature is very broad, indicating a short-lived perturbation which could be a mode of the optical table, or possibly due to the responsiveness of an optic that is not common to both arms.

Results

Testing was done for each of three specific embodiments of common-path NOPAs. Like their Michelson-based counterpart, the CP-NOPAs can exhibit broadband or narrow-band amplification, temporal compressibility, and excellent amplification efficiencies. The CP-NOPAs, especially the 1W-NOPA, are simple to build and maintain. The 1W-NOPA—which intentionally uses extra reflections to achieve a common-path geometry—damps most mechanical vibrations by about half. CP-NOPAs may find use in applications requiring increased robustness such as high signal-to-noise spectroscopy or carrier-envelope phase stabilization.

It is believe that one benefit of the common-path designs is that the reduction is time smearing at the focus in the mixing crystal. The effect occurs in M-NOPAs, and most other two-beam optical systems, because the white light and the pump are focused individually. In the common-path designs the white light and the pump are focused using a common mirror.

Figure 5:
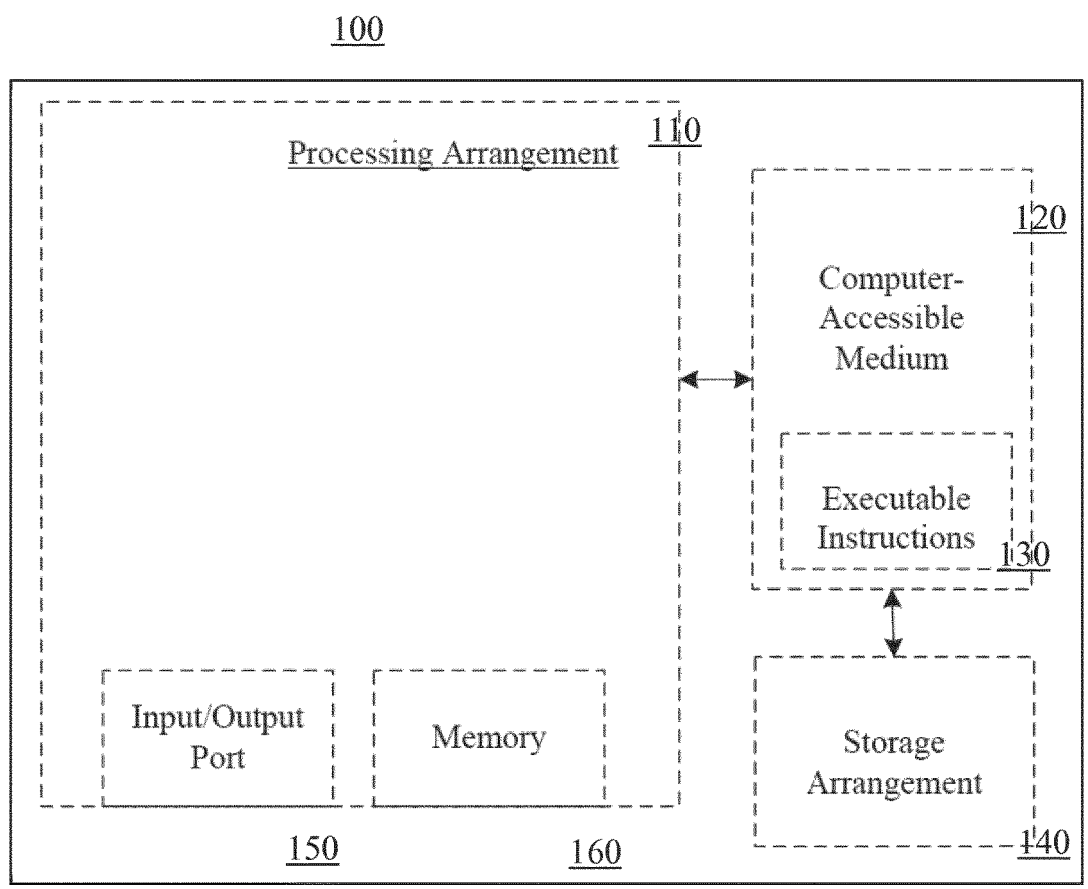
FIG. 5 illustrates a computer system for use with certain implementations.

Certain embodiments of the present invention may utilize a processor and/or memory, including as a computer to provide instructions. For example, automate positioning decks or platforms (not shown) can be used to position the optics, such as by servo/motor movement controlled by a computer. As shown in FIG. 5, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An optical parametric amplifier comprising:
a light source;
a phase-stable optical splitter selected from the group consisting of a phase mask and a Wollaston prism, the phase-stable optical splitter configured to receive light from the light source and split the received light into a first beam and a second beam;
first beam optics in optical communication with the phase-stable optical splitter for receiving the first beam;
second beam optics in optical communication with the phase-stable optical splitter for receiving the second beam; and
common path reflective elements positioned relative to the first beam optics and the second beam optics for receiving and redirecting light from the first beam optics and the second beam optics.

2. The optical parametric amplifier of claim 1, wherein the phase-stable optical splitter comprises the phase-mask and further comprising a first cylindrical lens and a second cylindrical lens with the phase-mask disposed there between.

3. The optical parametric amplifier of claim 2, wherein the first beam optics comprise a half-wave plate and polarizer, a first beta Barium Borate crystal, a blue-pass filter, a compensation glass and a wedge pair.

4. The optical parametric amplifier of claim 3, wherein the second beam optics comprise a half-wave plate and polarizer, a first spherical lens, a sapphire, and a second spherical lens.

5. The optical parametric amplifier of claim 4, wherein the common path reflective elements comprise a spherical mirror and a pick-off mirror.

6. The optical parametric amplifier of claim 5, further comprising a barium borate crystal optically downstream from the common path reflective elements.

7. The optical parametric amplifier of claim 1, wherein the phase-stable optical splitter comprise the Wollaston prism, and further wherein the phase-stable optical splitter comprise a Wollaston prism first beam optics comprise a first beam Wollaston prism receiving the first light beam from the Wollaston prism and the second beam optics comprise a second beam Wollaston prism receiving the second light beam from the Wollaston prism.

8. The optical parametric amplifier of claim 1, wherein the phase-stable optical splitter comprise the Wollaston prism, and further wherein the common path reflective elements comprise a first pair of dielectric mirrors in optical communication wherein.

9. The optical parametric amplifier of claim 8, wherein the common path reflective elements comprise a second pair of dielectric mirrors in optical communication wherein a first mirror of the second pair receives the first beam from the first beam optics and a second mirror of the second pair receives the second beam from the second beam optics.

10. The optical parametric amplifier of claim 9, wherein the first beam and second beam are parallel between the first pair and the second pair and nonparallel between the second pair and a second BBO crystal.

11. A method of optical parametric amplification comprising:
    splitting a beam of light, by one of a Wollaston prism or phase mask, into a first beam and a second beam, each of the first beam and second beam being phase-stable and parallel;
    optically processing the first beam with a set of first beam optics;
    optically processing a second beam with a set of second beam optics;
    reflecting the first beam and the second beam with common path reflective elements such that the first beam and second beam are non-parallel and cross at an optical element.

12. A computer-implemented machine for optical parametric amplification comprising:
    a phase-stable optical splitter selected from the group consisting of a phase mask and a Wollaston prism, the phase-stable optical splitter configured to receive a beam of light from a light source;
    first beam optics in optical communication with the phase-stable optical splitter;
    second beam optics in optical communication with the phase-stable optical splitter;
    common path reflective elements positioned relative to the first beam optics and the second beam optics;
    a processor; and
    a tangible computer-readable medium operatively connected to the processor and including instructions stored thereon for optical parametric amplification by:
        controlling splitting the beam of light into a first beam and a second beam with the phase-stable optical splitter, each of the first beam and second beam being phase-stable and parallel;
        controlling optical processing the first beam with the first beam optics;
        controlling optical processing a second beam with the second beam optics; and
        controlling reflection of the first beam and the second beam with the common path reflective elements such that the first beam and second beam are non-parallel and cross at an optical element.

13. The computer implemented machine of claim 12, wherein the phase-stable optical splitter comprise the Wollaston prism, and further wherein the first beam optics comprise a first beam Wollaston prism receiving the first light beam from the Wollaston prism and the second beam optics comprise a second beam Wollaston prism receiving the second light beam from the Wollaston prism.

14. The computer implemented machine of claim 12, wherein the phase-stable optical splitter comprise the Wollaston prism, and further wherein the common path reflective elements comprise a first pair of dielectric mirrors in optical communication wherein a first mirror of the first pair receives the first beam from the Wollaston prism and a second mirror of the first pair receives the second beam from the Wollaston prism.

15. The computer implemented machine of claim 12, wherein the phase-stable optical splitter comprise the Wollaston prism, and further wherein the common path reflective elements comprise a second pair of dielectric mirrors in optical communication wherein a first mirror of the second pair receives the first beam from the first beam optics and a second mirror of the second pair receives the second beam from the second beam optics.

16. The computer implemented machine of claim 15, wherein the first beam and second beam are parallel between the first pair and the second pair and nonparallel between the second pair and a second BBO crystal.

* * * * *